J. B. BAKER.
CIGAR AND PENCIL VENDING MACHINE.
APPLICATION FILED JULY 3, 1908.
998,667.
Patented July 25, 1911.
5 SHEETS—SHEET 1.
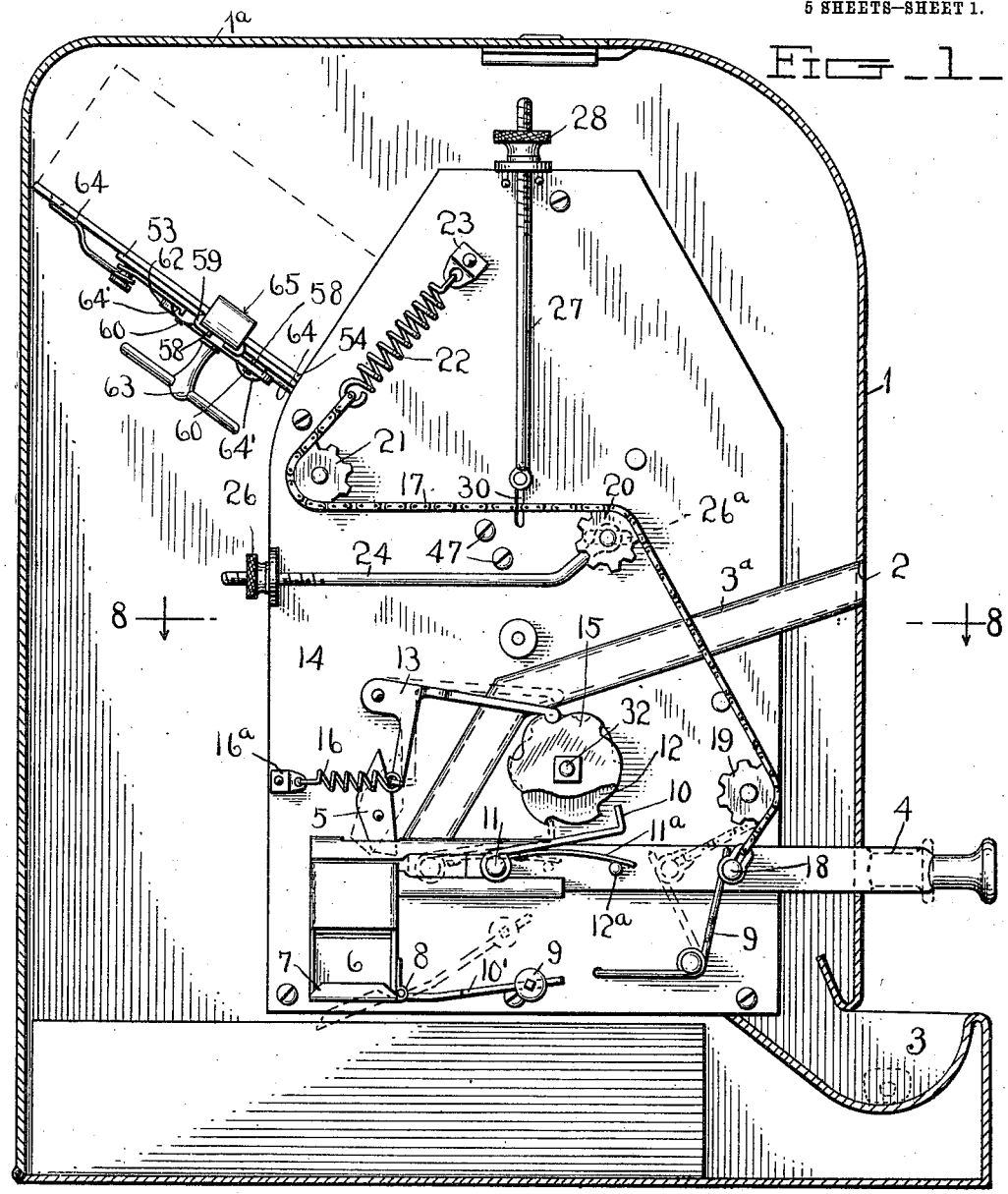

J. B. BAKER.
CIGAR AND PENCIL VENDING MACHINE.
APPLICATION FILED JULY 3, 1908.
998,667.
Patented July 25, 1911.
5 SHEETS—SHEET 2.
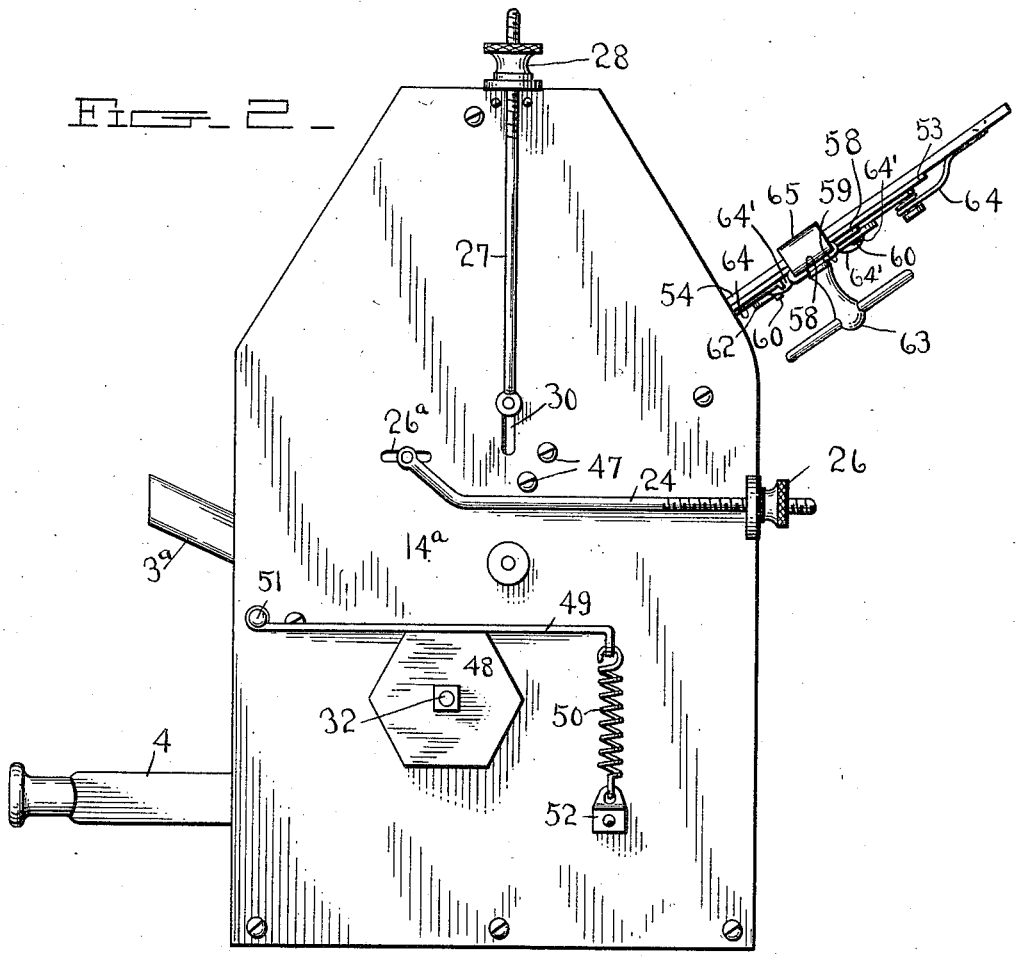
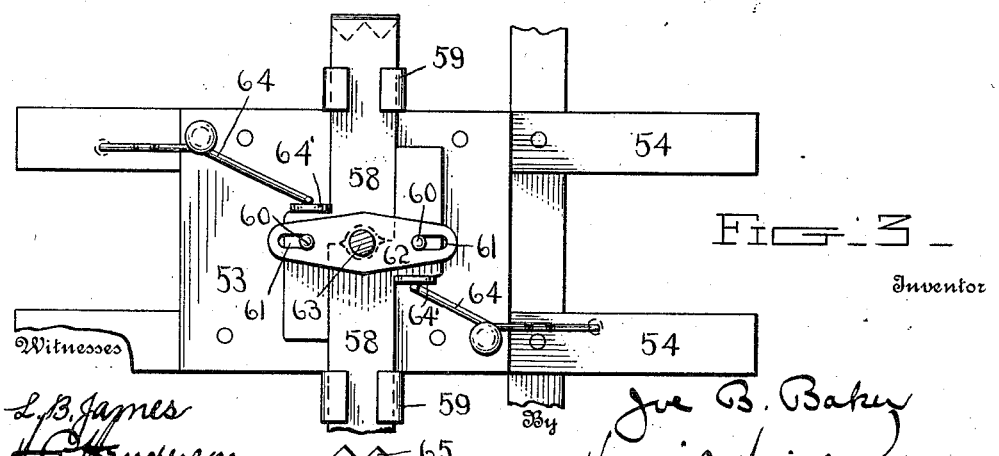

J. B. BAKER.
CIGAR AND PENCIL VENDING MACHINE.
APPLICATION FILED JULY 3, 1908.
998,667.
Patented July 25, 1911.
5 SHEETS—SHEET 3.
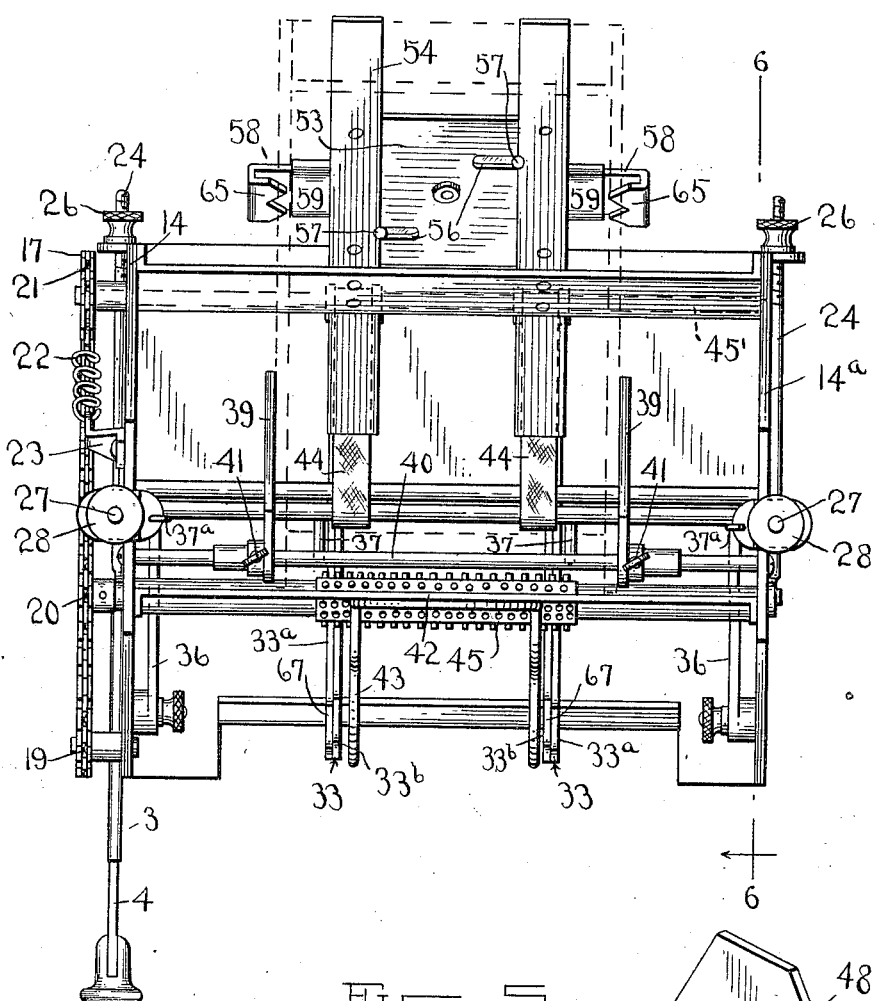
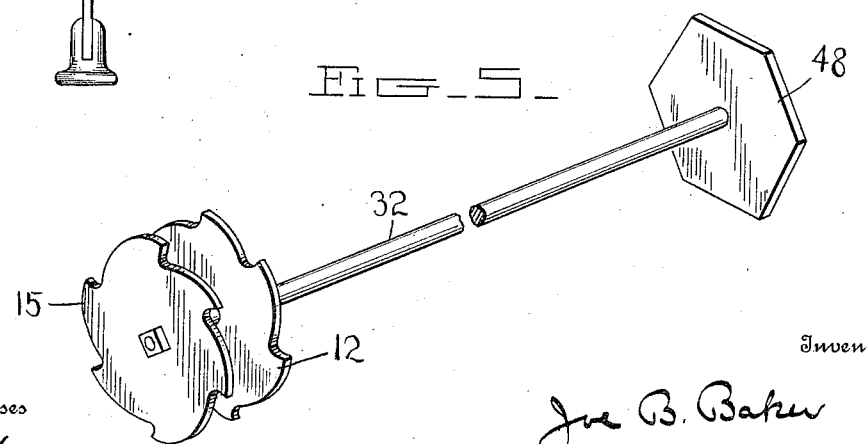

J. B. BAKER.
CIGAR AND PENCIL VENDING MACHINE.
APPLICATION FILED JULY 3, 1908.
998,667.
Patented July 25, 1911.
5 SHEETS—SHEET 4.
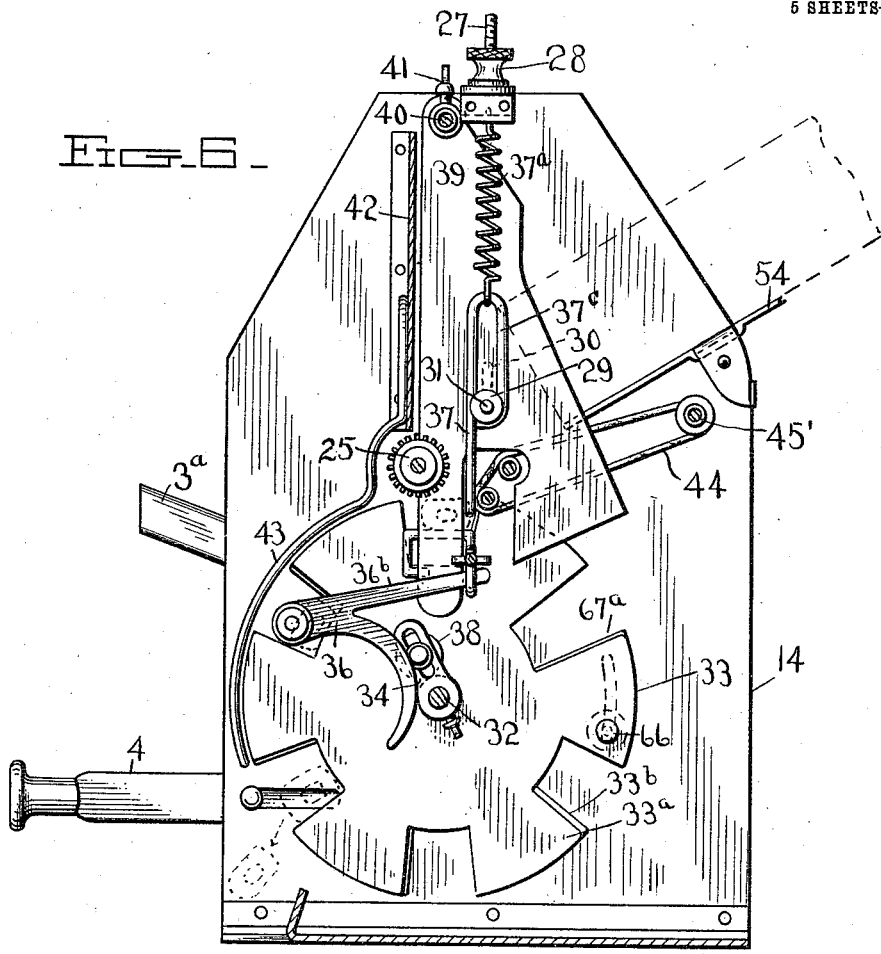
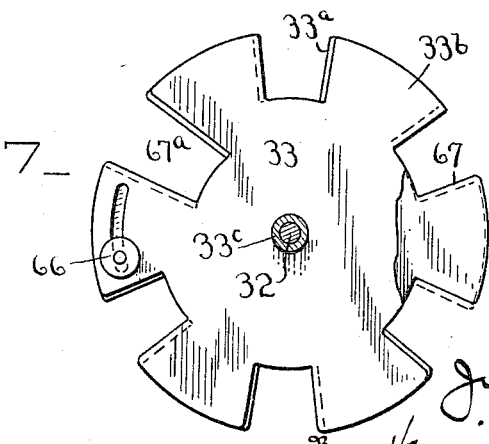

J. B. BAKER.
CIGAR AND PENCIL VENDING MACHINE.
APPLICATION FILED JULY 3, 1908.
998,667.
Patented July 25, 1911.
5 SHEETS—SHEET 5.
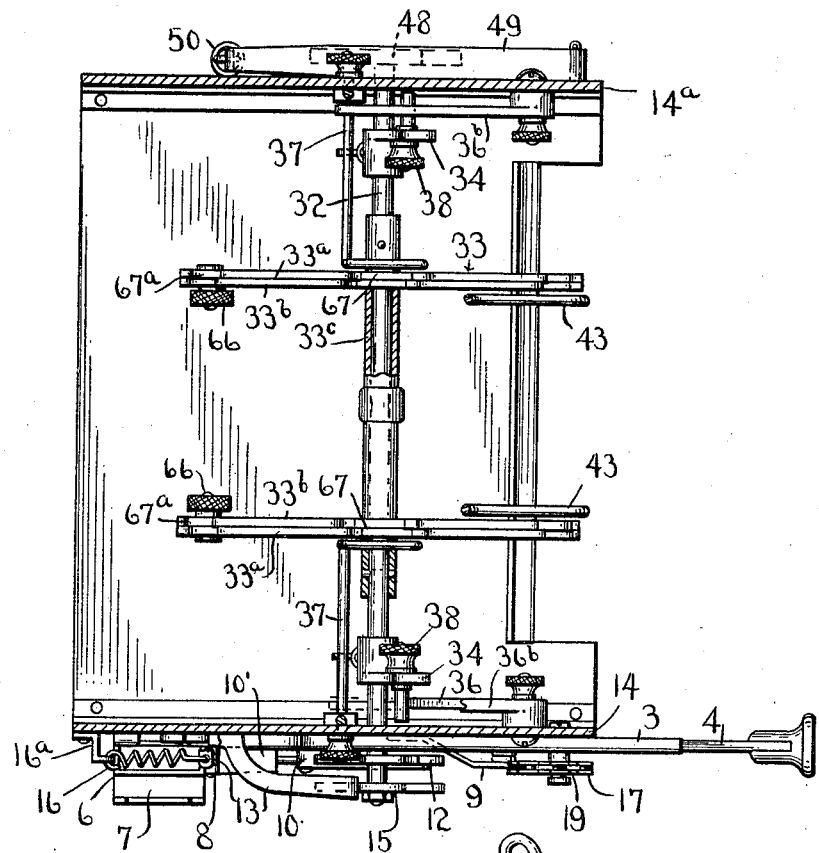
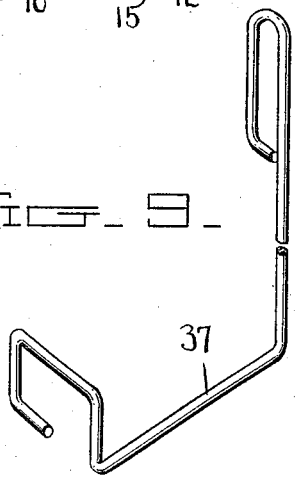
Witnesses
E. B. James
H. C. Henderson
Inventor
Joe B. Baker
By
Attorneys

UNITED STATES PATENT OFFICE.

JOE BENJAMIN BAKER, OF LAWTON, OKLAHOMA.

CIGAR AND PENCIL VENDING MACHINE.

998,667. Specification of Letters Patent. Patented July 25, 1911.

Application filed July 3, 1908. Serial No. 441,904.

*To all whom it may concern:*

Be it known that I, JOE B. BAKER, citizen of the United States, residing at Lawton, in the county of Comanche and State of Oklahoma, have invented certain new and useful Improvements in Cigar and Pencil Vending Machines, of which the following is a specification.

My invention relates to improvements in cigar and cigarette vending machines. The machine, however, is adapted to vend other articles which are similar in size and shape to the above specified articles.

In inventions of this type the difficulty to be met lies in the adaptability of the device to articles which are similar in shape, but which vary in size and dimensions, and are only adapted to vend one kind of article.

In the herein disclosed device a single machine is adapted upon proper adjustment to be used for vending several distinct kinds of articles. Such articles as pencils, gum, matches, knives, etc., in fact any article of a size which may come within the limits of the adjustment of the machine, may be vended as easily and successfully as cigars. Furthermore, should a cigar or cigarette become broken, it drops through the holding devices of the machine without clogging the operating mechanism thereof.

A further purpose of this device is to give to the purchaser the advantage of a cheaper rate where a quantity of cigars is purchased at one time. This is accomplished by a mechanism which at a certain definite interval delivers more than one cigar at a time.

The device will be more clearly disclosed in the appended drawings and specification in which like numerals as used in the several figures indicate like parts.

Figure 1 is an elevation showing part of the case removed; Fig. 2 is an elevation of the opposite side to that shown in Fig. 1 with the casing removed; Fig. 3 is a detail of the cigar box holding device; Fig. 4 is a plan view of the device; Fig. 5 is a detail of the holding and position mechanism; Fig. 6 is a section on lines 6—6 Fig. 4; Fig. 7 is a detail of the article delivering disk; Fig. 8 is a section on line 8—8 Fig. 1; and Fig. 9 is a detail of the cigar holding member.

The casing 1 is formed with an opening 2 for the insertion of a coin, and with a trough 3 for the delivery of the article purchased. The slot $3^a$ is adapted to deliver a coin in position, to be struck by the lever 4 on its forward actuation, and thereby to operate the member 5, after which the coin drops into the receptacle 6 on the trap 7, which is pivoted at 8 and controlled by an adjustable weight 9 on the wire 10, which is formed integral with said trap 7, from which the coin drops into the base of the machine. A spring is adapted to return the lever 4 to normal position. The detent 10 is pivoted at 11 on the lever 4, and is held resiliently in an upward position, by means of the spring $11^a$ resting on the pin $12^a$, to engage the operating wheel 12.

The member 5 is adapted to contact with the holding detent 13, which is pivoted on the frame 14 and engages the holding wheel 15. The holding detent 13 is normally held in contact with the holding wheel 15 by means of the spring 16, which is attached at one end to the frame 14 by the bracket $16^a$. The chain 17 is attached at one end to the lever 4 by means of the pin 18, and runs over an idle wheel 19, the sprockets 20 and 21, and is held taut by means of the spring 22, which is attached at one end to said chain 17 and at the other end to the bracket 23, which is rigidly attached to the frame 14. The members 24, 24 are adjusting rods for positioning the feeding member 25 (shown in Fig. 6). These rods 24, 24 are adapted to be adjusted by the screws 26, 26 and the axis of the feeding member 25 is permitted a limited motion in a horizontal direction by the slots $26^a$, $26^a$.

The rods 27, 27 are adapted to be adjusted by the thumb screws 28, 28 and thereby to control the stops 29, 29 which are connected through the slots 30, 30 by means of the screws 31, 31 to the rods 27, 27. These stops 29, 29 engage the loops $37^c$, $37^c$ of the cigar holding members 37, 37 and determine where their members shall be held against the force of the springs $37^a$, $37^a$.

The operating wheel 12, together with the holding wheel 15 (as shown in Fig. 1), are rigidly attached to the shaft 32, on which is carried the delivering disks 33, 33 (as shown in Fig. 6). The shaft 32 also carries members 34, 34 which (as shown in Figs. 4 and 6) are adapted to operate the bell crank members 36, 36, and which in turn operate the cigar holding members 37, 37. The crank members 34, 34 are slotted at 35, 35 and carry in said slots adjustable pins 38, 38, to determine the amount of movement to be given to the bell crank members 37, 37. Guide plates 39, 39 are carried on the rod 40 and are adjustable thereon by means of thumb screws 41, 41. Said guide plates 39, 39 are adapted to rest against a plate 42 (shown in Fig. 6), which carries the wire fingers 43 (shown in Figs. 4 and 6). The function of these fingers is to prevent the vended article from dropping out of the retaining slots in the vending disks, until the said slots have reached the discharge position.

Rubber bands 44, 44 are carried on the shaft 45, which is actuated by the sprocket 21, and pass over idler rolls 46, 46. These idler rolls are held in position in the frame 14 by means of the screws 47. The feeding member 25 (as shown in Figs. 4 and 6), is a cylindrical rubber brush and adapted to prevent the feeding mechanism in the delivering disk from becoming clogged by several cigars attempting to enter the delivery slots at one time.

The shaft 32 as shown in Figs. 2 and 5 carries rigidly attached thereto the positioning member 48. This member is adapted to be resiliently held in position by means of the lever 49 and the spring 50. The lever 49 is pivotally attached at 51 to the frame 14$^a$, and the spring 50 is also attached to the frame 14$^a$ by means of the bracket 52.

The box holding device as disclosed in Figs. 3 and 4 consists of a base plate 53 which is rigidly attached to the guiding members 54, 54, and which are riveted to the sustaining member of the frame of the machine. The base plate is slotted at 56, 56. These slots carry guide pins 57, 57 of the clamping dogs 58, 58 which are adapted to slide in the retainers 59, 59. These clamping dogs also carry pins 60, 60 that fit into slots 61, 61 in the member 62. Rigidly attached to 62, is the hand lever 63 shown in Fig. 1. The spring members 64, 64 bear against the clamping dogs 58, 58 on the spring members 64, 64. These springs force the toothed ends 65, 65 of the clamping dogs into the wood of the cigar box thereby retaining the cigar box in the proper position in the machine.

The delivering disks 33, 33 are formed of two sets of similar disks as shown in Figs. 7 and 8. The outer disks 33$^a$, 33$^a$ are rigidly attached to the shaft 32. The disks 33$^b$, 33$^b$ are connected together by means of a hollow shaft 33$^c$ shown in Fig. 8. One of said disks 33$^b$ is slotted as shown in Fig. 7. The companion disk 33$^a$ carries the thumb screw 66. By means of this thumb screw and slot the disks 33$^a$, 33$^a$ may be adjusted on the disks 33$^b$, 33$^b$ thereby regulating the width of the slots 67. It will be noted that one slot 67$^a$ is deeper than the other slots in the delivering wheel 33. The purpose of this deeper slot 67$^a$ is to permit the operation of a chance mechanism hereinafter to be described.

The operation of the machine is as follows: The rear casing 1$^a$ is removed, the hand lever 63 is turned to the right and the cigar box from which one end has been removed, is set on the base plate 53. As the hand lever 65 is released the springs 64, 64 force the toothed ends 65, 65 of the clamping dog into the wood of the cigar box, thereby rigidly securing the box in position. The cigars roll from the open end of the box down against the plate 42 and rest upon the feeding member 25 and the rubber bands 44, 44. The guide plates 39 are adjusted to fit the length of the cigar. The feeding member 25 is adjusted by means of the thumb screws 26, 26 so that one cigar will drop between the feeding member 25 and the rubber bands 44, 44 and rest in the open slot 67 of the delivering disks 33, 33. The thumb screw 66 is loosened and the disks 33$^a$, 33$^a$, and 33$^b$, 33$^b$ are adjusted to fit the sides of the cigar. The cigar holding members 37, 37 which determine the depth to which the cigar is allowed to drop in the slot 67, are now adjusted by means of thumb screws 28, 28 which through the rods 27, 27 and the stops 29, 29 operate to determine the position at which the members 37, 37 will be held by means of the springs 37$^a$, 37$^a$, until one cigar only is permitted to lie in the slot 67.

The machine having been filled and properly adjusted it is now ready to be operated as a coin-controlled vending machine. The coin is dropped through the casing into the slot 3$^a$ and rests in contact with the member 5 immediately in front of the push lever 4. The lever 4 is thrust forward, pushing the coin against the member 5 which in turn lifts the detent 13 from a locking wheel 15. Simultaneously with the lifting of the detent 13, the operating detent 10 is thrown into engagement with the operating wheel 12. This wheel being rigidly connected to the shaft 32 turns the delivery disks 33, 33, passes a cigar beneath the wire fingers 43 and permits the cigar to drop from the delivery wheel into the trough 3 in the casing. Simultaneously with the forward movement of the delivery disk the cigar feeding member 25 and the rubber bands 44 are moved in an upper direction by means of the chain 17 actuating the sprockets 20 and 21, thus preventing a cigar from dropping upon the edges of the feeding disks 33, 33 and thereby being broken.

As the operating handle 4 is returned to normal position by the spring 9, the chain 17 being retracted by the spring 22 operates the rubber bands 44, 44 and the feeding member 25 to feed a cigar into the open slot 67 in the delivering disks 33, 33, which are now held stationary by means of the holding member 48. The rubber bands 44, 44 operate directly beneath the guiding members 54, 54 of the cigar box holding frame, and if in the operation of the device a cigar should become broken or dislodged from the box, it will fall through the space between the members 54, 54 into the bottom casing of the machine.

At every sixth purchase the members 34, 34 which are carried on the shaft 32, which shaft carries the delivering disks 33, 33, are revolved to a position where the adjusted pins 38, 38 contact with the cam surface of the bell crank members 36, 36. Upon further revolution of the shaft 32, the pins 38, 38 force outward the arms 36$^a$, 36$^a$ of the bell cranks 36, 36 and thereby force downward the arms 36$^b$, 36$^b$ which resting upon the horizontal parts of the cigar holding members 37, 37 carry these said cigar holding members in a downward direction against the force of the springs 37$^a$, 37$^a$. Since the number of cigars which drop in the slots 67 is determined by the position of the said holding members 37 it will be seen that at this operation the machine will deliver more than one cigar. The number being determined by the adjustment of the thumb screw pins 38, 38.

I desire it to be understood that the above described device is to be illustrative, and not limiting as to the scope of my invention.

What I claim as my invention is:—

1. In a cigar vending machine the combination with a supporting frame of a rotative shaft mounted therein, a radially slotted delivery disk mounted upon said shaft, a vertically movable article carrier, a support mounted above the delivery disk for carrying the cigars to be vended, springs normally tending to elevate the article carrier pivotally mounted members, and means upon the rotative shaft for actuating said pivotally mounted members, said members in turn depressing the article carrier against the tension of its spring to thereby convey an article to be vended from said support to one of the radial slots of the delivery disk.

2. In a cigar vending machine the combination with a supporting frame of a rotative shaft mounted therein, a radially slotted delivery disk mounted upon said shaft, a vertically movable article carrier, a support mounted above the delivery disk for carrying the cigars to be vended, springs normally tending to elevate the article carrier pivotally mounted members, and means upon the rotative shaft, a feeding member, a sprocket wheel upon the exterior of the frame for actuating the feeding member, another sprocket wheel upon the exterior of the frame, rubber bands adjacent the feeding member and coöperating therewith to which movement is imparted from the second named sprocket wheel, a sprocket chain passing over both of said sprocket wheels, a spring normally pulling said sprocket chain in one direction and a reciprocatory slide for actuating the sprocket chain in the opposite direction.

3. In a cigar vending machine the combination with a supporting frame of a rotative shaft mounted therein, a radially slotted delivery disk mounted upon said shaft, a vertically movable article carrier, a support mounted above the delivery disk for carrying the cigars to be vended, springs normally tending to elevate the article carrier pivotally mounted members for actuating said article carrier, and means upon the rotative shaft for actuating the pivotally mounted members, a feeding member, a sprocket wheel upon the exterior of the frame for actuating the feeding member, another sprocket wheel upon the exterior of the frame, rubber bands adjacent the feeding member and coöperating therewith to which movement is imparted from the second named sprocket wheel, a sprocket chain passing over both of said sprocket wheels, a spring normally pulling said sprocket chain in one direction and a reciprocatory slide for actuating the sprocket chain in the opposite direction, a ratchet wheel on the rotative shaft and a pawl on the slide adapted to engage said ratchet wheel.

In testimony whereof I affix my signature, in presence of two witnesses.

JOE BENJAMIN BAKER.

Witnesses:
ROY MITCHELL,
C. S. STEPHENSON.

---

Copies of this patent may be obtained for five cents each, by addressing the "Commissioner of Patents, Washington, D. C."